(No Model.)

G. ERTEL.
BALING PRESS.

No. 337,567. Patented Mar. 9, 1886.

WITNESSES:
Donn Twitchell
C. Sedgwick

INVENTOR:
G. Ertel
BY Munn & Co.
ATTORNEYS.

UNITED STATES PATENT OFFICE.

GEORGE ERTEL, OF QUINCY, ILLINOIS.

BALING-PRESS.

SPECIFICATION forming part of Letters Patent No. 337,567, dated March 9, 1886.

Application filed October 24, 1885. Serial No. 180,837. (No model.)

*To all whom it may concern:*

Be it known that I, GEORGE ERTEL, of Quincy, in the county of Adams and State of Illinois, have invented certain new and useful Improvements in Baling-Presses, of which the following is a full, clear, and exact description.

My invention relates to baling-presses of that class in which the bales are formed continuously one behind the other in the press box or case, and in which the tied bales are discharged from the rear end of the press-box by the pressure of the advancing bales.

The objects of the invention are to provide for a proper degree of resistance to the pressure or thrust of the plunger on the hay, straw, cotton, or other material fed into the press to be baled, so that the weight of the finished bales will be regulated or controlled automatically;
also, to provide for smoothing the surface of the bales and for the quick and easy tying of the bales.

The invention consists in certain novel features of construction and combination of parts of the baling-press, as hereinafter fully described.

Reference is to be had to the accompanying drawings, forming part of this specification, in which similar letters of reference indicate corresponding parts in both the figures.

Figure 1:
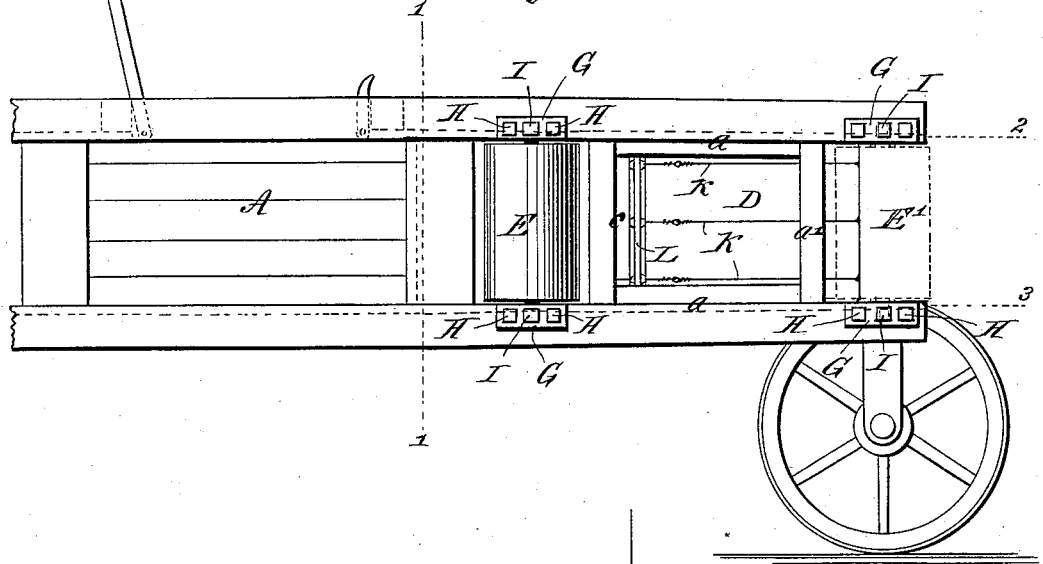
Figure 2:
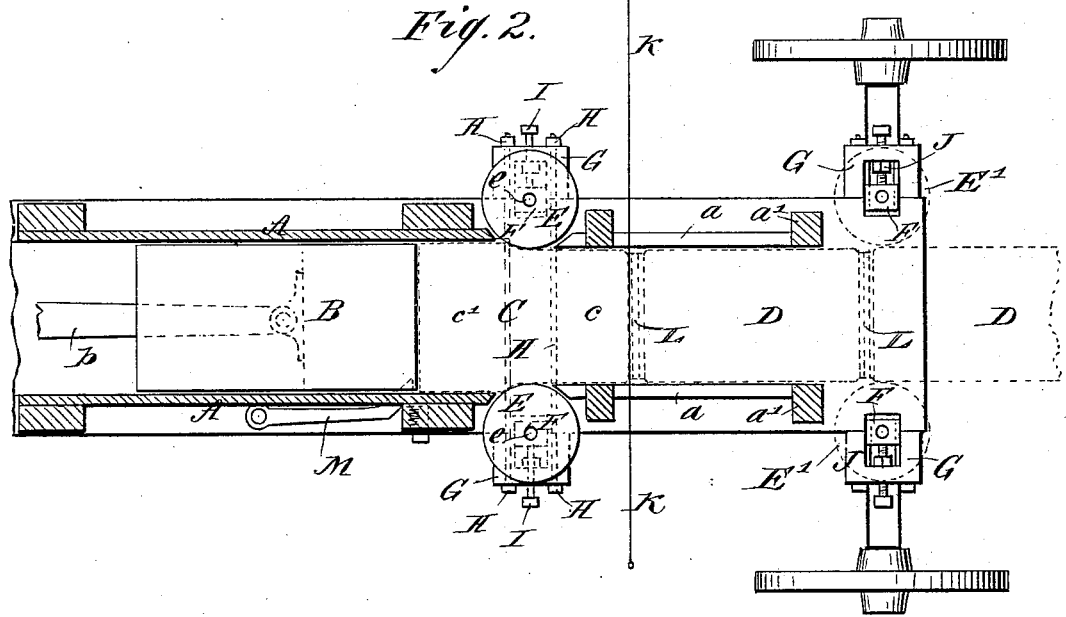

Figure 1 is a side elevation of the rear part of a baling-press embodying my improvements. Fig. 2 is a plan view thereof, with the press-box in horizontal section and the rear pair of rollers shown in dotted lines.

At opposite sides of the press case or frame and rear of the press-box A, in which the plunger B works to press the hay or other material C into bales D, are journaled a pair of vertically-ranging rollers, E E, the shafts e of which are fitted into bearing-blocks F, which are adapted to slide laterally of the press-case in frames G G, bolted to the opposite sides of the case, preferably by bolts H H, which extend from side to side or clear across the case, as indicated in dotted lines in Fig. 2. The bearing-blocks F, at the top and bottom or ends of the rollers E, are connected to screws I, which work in nuts J, held to the frames G, so that by turning the screws the opposite rollers, E E, may be set nearer together or farther apart to compress the body C of hay more or less laterally, as it is forced backward by the plunger to form the bale, the peripheries of the rollers serving as side walls to the press-box.

It is evident that the nearer to each other the rollers are set the greater will be the resistance they offer to the rearward passage of the hay and the tighter the hay will be packed; hence to control the compactness or weight of the bale it only is necessary to adjust the rollers toward or from each other.

In rear of the rollers E E the press-case is narrowed laterally, as indicated at *a a* in Fig. 2, to receive the packed hay *c* passing the rollers, and the sides of the press at *a a* are open, so that the bale-ties K may be passed through grooves at the forward side of the spacing or follow board L, placed between the bales, as indicated in Fig. 2, and when the rear end of the packed hay *c*, forming the untied bale, passes the side posts, *a' a'*, of the press-frame the ties K will be bent forward by the posts *a'*, and the long ends of the ties will then be passed by the attendant through the rear grooves of the follow-board next behind, and the ends of the ties will be connected, as shown in Fig. 1, to complete the bale, which will be discharged from the open rear end of the press-case by the advance of the bales being formed in front of it, and as indicated in Fig. 2. The opposite side rollers, E E, alone would offer the necessary resistance to the advance of the hay packed to give sufficient density to the hay, which is narrowed at *c* in rear of the points of contact of the rollers E E with it for a couple of inches, (more or less,) as shown in Fig. 2; hence the finished bales will be narrower than the press-box A and the plunger B; but in order to relieve the rollers of a part of the strain of holding the hay against the pressure of the plunger and also to make the finished bales a few inches less in depth than the depth of the press-box A, I gradually taper the bale-opening vertically about from a point indicated by the dotted line 1 1 in Fig. 1 to the rear end of the press-case, where the bales are discharged, and as will appear from the dotted lines 2 3, which indicate the full interior height or depth of the press-box A.

It is obvious that the above-described vertical taper or convergence of the top and bottom walls—one or both—of the press-case will offer a resistance to the rear passage of the untied and tied bales by a vertical pressure thereon, while the rollers E E exert a lateral pressure on the hay; hence the rollers will or need not be overstrained, and the finished bales will be a few inches smaller both in width and depth than the inside of the press-box A.

Other advantages of the rollers E E are that while they hold the hay against the pressure of the plunger their rolling contact with the hay does not bruise, crush, or break the hay, and the sides of the finished bale will be left quite smooth. Furthermore, the location of rollers E E, causing them to act on the untied and partly-pressed bale just behind the press-box A for about one-half the length of a finished bale in rear of the extreme rearward position of the plunger, gives a special advantage—viz., all that part of the pressed hay at $c$ in rear of the rollers will be held by the rollers, so it will have little or no expansion as the plunger withdraws; hence only that part $c'$ of the hay in front of the rollers will be allowed to expand rearward as freely as the retainers M will permit, to react on the plunger on its return-stroke. Consequently the plunger will not rebound violently by the expansion of the hay, and power connections to the plunger-beam $b$ will not be liable to jar, displacement, or damage, which is an important consideration when toggle-bars or loose links and parts are employed to attach the plunger-beam to the sweep. Furthermore, presses with the rollers E E applied to them may be made from two to six feet shorter than presses of like capacity otherwise constructed; hence my press will be lighter and may be more easily handled.

I have shown and described, as above, the preferred method and means of carrying out the main underlying principle of my invention—namely, the employment of compressing-rollers at the sides of the press-case to act on the hay or other material being baled, so as to cause said material to offer sufficient resistance to the pressure of the plunger properly to compact the bales; but it is obvious that the rollers may be otherwise arranged. For instance, but one roller, E, may be employed at one side or at the top or bottom of the press-case, or the two opposite rollers may be placed at the top and bottom of the press-case, instead of at opposite sides of the case, as shown, and the rollers may or may not be adjustable, so as to be set within the press-case more or less, as a roller or opposite rollers may be journaled in fixed positions relatively to the interior of the press-case, whereby bales of the same length of any given material will have a uniform weight, as will readily be understood.

I have indicated in dotted lines at E' E' how a second set or pair of rollers may be journaled in boxes F, fitted to slide in frames G, and made adjustable by screws I at the extreme forward end of the press-case, so that the bales D, after being tied, may receive a final smoothing pressure and finish between said rollers E' E' as they are being discharged from the machine.

I wish it to be understood that the compressing and smoothing rollers E E may be located where the rollers E' E' are shown, so as to offer resistance to the plunger from the extreme rear end of the press-case, and the second pair of rollers E' E' will then be dispensed with, and when the rollers E E are located at the rear end of the press-box A, as shown, the use of the second pair of smoothing-rollers E' E' is optional.

Having thus fully described my invention, I claim as new and desire to secure by Letters Patent—

1. The combination, with the box of a baling-press, of a roller journaled unyieldingly in a side of the press in front of where the bale is tied, substantially as shown and described.

2. A baling-press constructed with oppositely-placed rollers journaled unyieldingly to and projecting within the press-box in front of where the bale is tied, substantially as shown and described, whereby resistance is offered by the rollers to the thrust of the plunger to insure proper density of the bales and the surface of the bales is smoothed, as set forth.

3. A baling-press constructed with smooth-faced rollers journaled unyieldingly across the sides of the press-box and behind where the bale is tied, substantially as shown and described, whereby the entire surfaces of the bales next the rollers will be smoothed by them as the bales are discharged from the press, as set forth.

4. A baling-press constructed with rollers at the sides of the press-box, and said rollers made adjustable, so as to be projected more or less into the interior of the box, substantially as shown and described, whereby the density of the bales may be regulated by shifting the rollers, as set forth.

5. A baling-press comprising a baling-box, A, a plunger, B, operating therein, and rollers journaled unyieldingly to the press-case in rear of the box A, substantially as shown and described, whereby the untied material being formed into a bale will be compressed to offer resistance to the thrust of the plunger and violent rebound of the plunger will be prevented, as set forth.

6. The combination, with the press-box of a baling-press contracted at its rear end, of one or more rollers in front of said contracted portion, substantially as shown and described.

7. A baling-press constructed with two rollers journaled to and projecting within opposite sides of the press-box, and the walls of said box at the sides where the rollers are placed being contracted in rear of the rollers, and the other sides of the box being convergent or tapering toward the end from which the bales are discharged, substantially as shown and described, whereby the compressing of the material by the rollers will be aided by the convergence of the press-box to secure resistance to the thrust of the plunger in forming the bales, as set forth.

8. A baling-press comprising a box, A, contracted at its sides, and two of said sides being formed open to allow of tying the bale, a plunger, B, operating in the press-box, and rollers E E, journaled unyieldingly in the press-case, substantially as shown and described, and for the purposes herein set forth.

9. A baling-press comprising a baling-box, A, a plunger, B, operating therein, rollers E E, journaled to and projecting within the press-case, and said case being contracted at the sides at which the rollers operate to confine the material passing the rollers, and the case also being open to allow tying of the bale, and bale-smoothing rollers E', journaled at the discharge end of the press-case, substantially as herein set forth.

GEORGE ERTEL.

Witnesses:
T. J. SEEHORN,
CARL E. EPLER.